US008171146B2

(12) United States Patent
Chen et al.

(10) Patent No.: US 8,171,146 B2
(45) Date of Patent: May 1, 2012

(54) UTILIZATION OF MEDIA CAPABILITIES IN A MIXED ENVIRONMENT

(75) Inventors: Yaan Mirng Jeffrey Chen, San Jose, CA (US); Faisal Sivayudeen, Kerala (IN); Vijay Arumugam Kannan, Milpitas, CA (US); Yosef Rizal Tamsil, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 11/765,543

(22) Filed: Jun. 20, 2007

(65) Prior Publication Data

US 2008/0317065 A1 Dec. 25, 2008

(51) Int. Cl.
*G06F 15/16* (2006.01)

(52) U.S. Cl. .......................... 709/228; 370/252; 370/260

(58) Field of Classification Search ........................ None
See application file for complete search history.

(56) References Cited

U.S. PATENT DOCUMENTS

| | | | |
|---|---|---|---|
| 5,371,534 A * | 12/1994 | Dagdeviren et al. | 348/14.01 |
| 6,757,250 B1 * | 6/2004 | Fayad et al. | 370/235.1 |
| 7,006,472 B1 * | 2/2006 | Immonen et al. | 370/332 |
| 7,149,515 B2 * | 12/2006 | Hallin et al. | 455/432.2 |
| 2004/0203894 A1 * | 10/2004 | Watanabe et al. | 455/456.1 |
| 2004/0208133 A1 * | 10/2004 | Jay et al. | 370/252 |
| 2004/0213257 A1 * | 10/2004 | Abdelilah et al. | 370/395.1 |
| 2005/0041603 A1 * | 2/2005 | Tighe et al. | 370/260 |
| 2005/0174993 A1 * | 8/2005 | Gass | 370/352 |
| 2005/0195741 A1 * | 9/2005 | Doshi et al. | 370/230 |
| 2007/0078986 A1 * | 4/2007 | Ethier et al. | 709/227 |

OTHER PUBLICATIONS

ITU-T Recommendation H.245 "Control Protocol for Multimedia Communication" Published Mar. 1996. Retrieved on Jun. 13, 2011 from http://www.itu.int/rec/T-REC-H.245/en.*
"Draft New Recommendation H.361 (ex H.mmqos) "End-to-End Quality of Service (QoS) and Service Priority Signalling in H.323 Systems" (for Consent)", [online]. International Telecommunications Union, ITU-T SG16, Geneva, Switzerland, Apr. 3-13, 2006 [retrieved on Apr. 2, 2007]. Retrieved from the Internet: <URL: http://www.itu.int/md/T05-SG16-060403-TD-PLEN-0262>,17 p.
Rosenberg, J. , et al., "SIP: Session Initiation Protocol", *Network Working.Group, Request for Comments: 3261*, (2002),269 p.

* cited by examiner

*Primary Examiner* — Jason Mattis
*Assistant Examiner* — James P Duffy
(74) *Attorney, Agent, or Firm* — Schwegman, Lundbery & Woessner, P.A.

(57) ABSTRACT

An apparatus and method for negotiating media capabilities is described. The method may comprise receiving an invite to establish a connection between a caller endpoint device and one of a plurality of callee endpoint devices of a shared line and identifying an initial common media capability between the caller endpoint device and the plurality of endpoint devices. Thereafter, the method may comprise negotiating a connection between the caller endpoint device and the callee endpoint device using the common media capability and determining if the caller endpoint device and the callee endpoint device have a common enhanced media capabilities. The connection may be re-negotiated using the enhanced media capability.

30 Claims, 12 Drawing Sheets

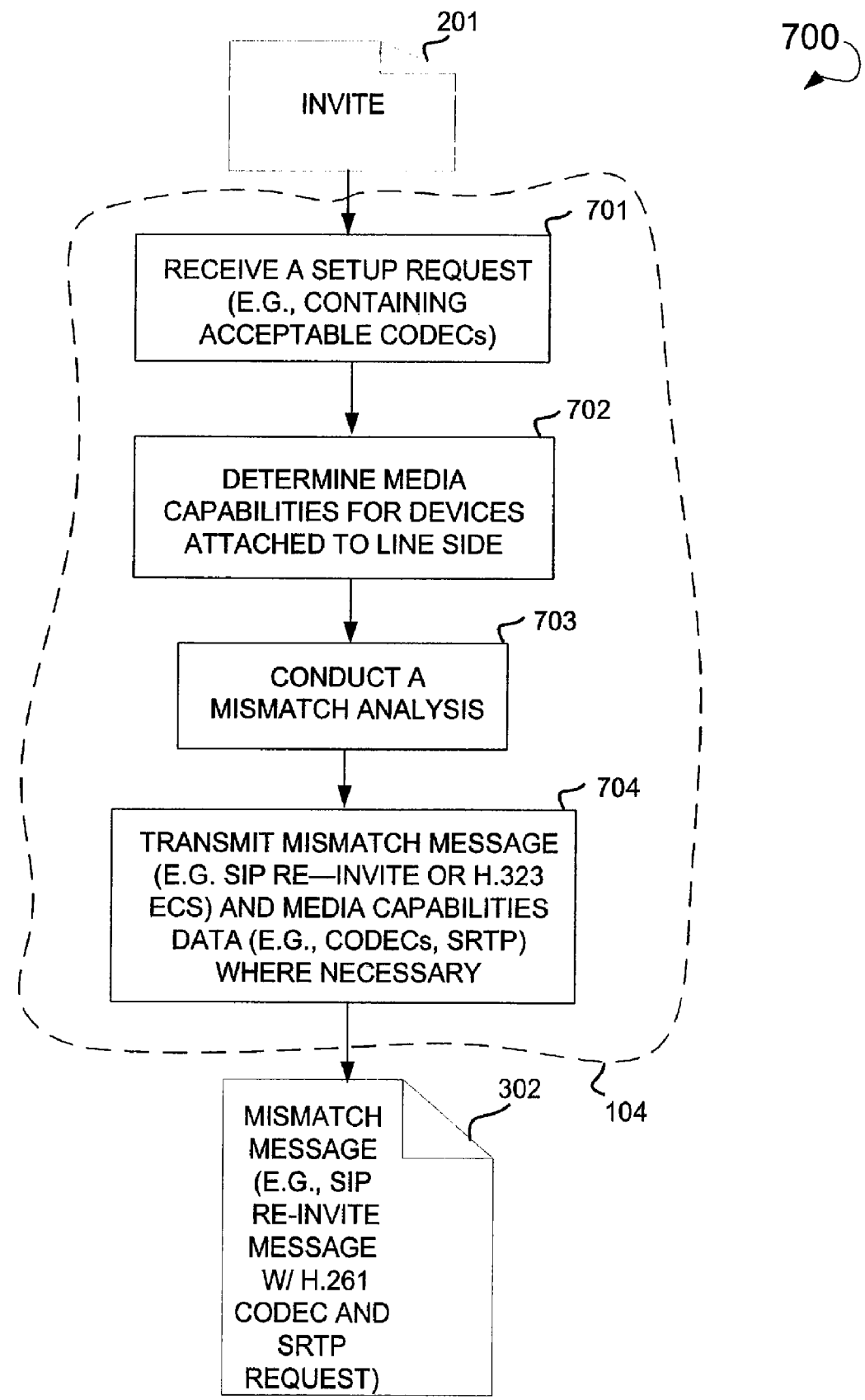

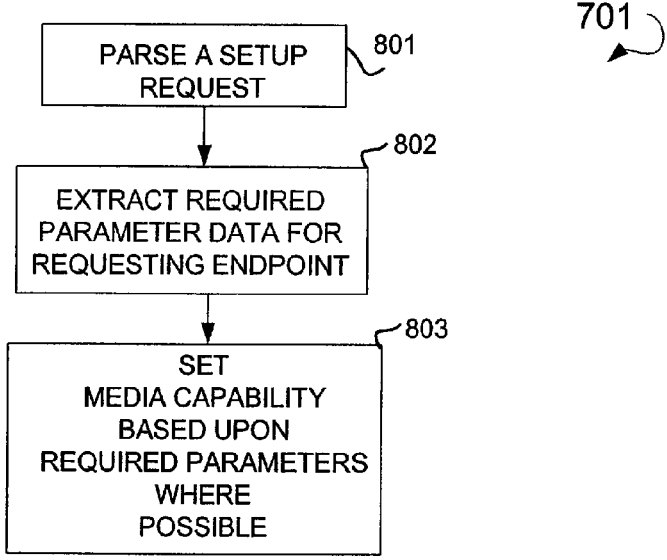
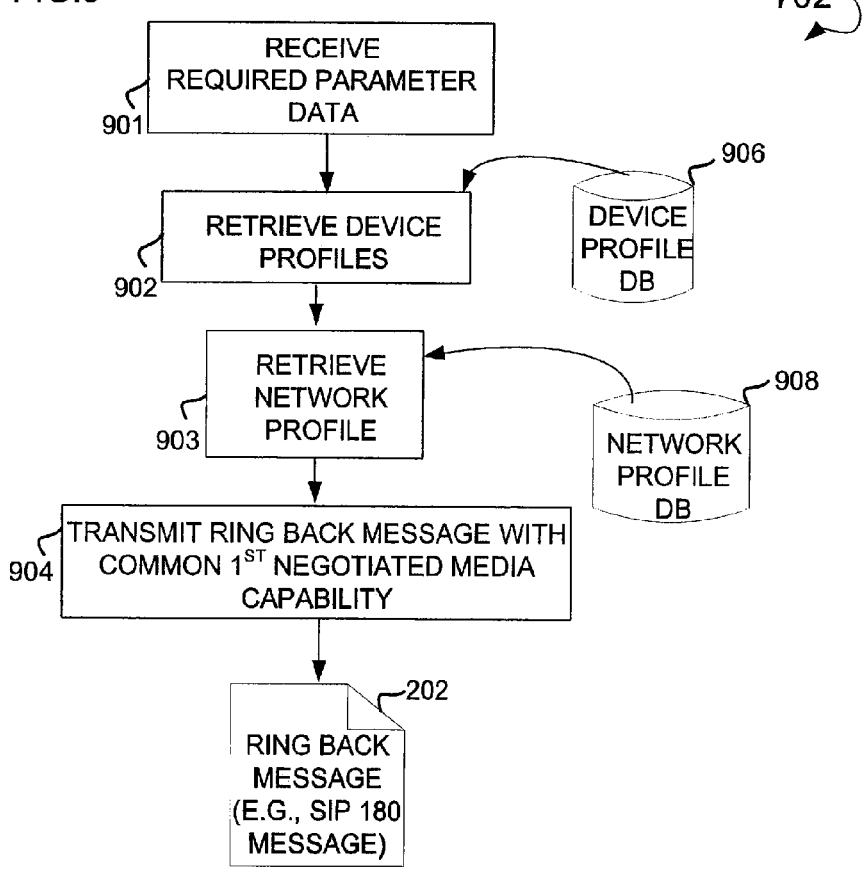

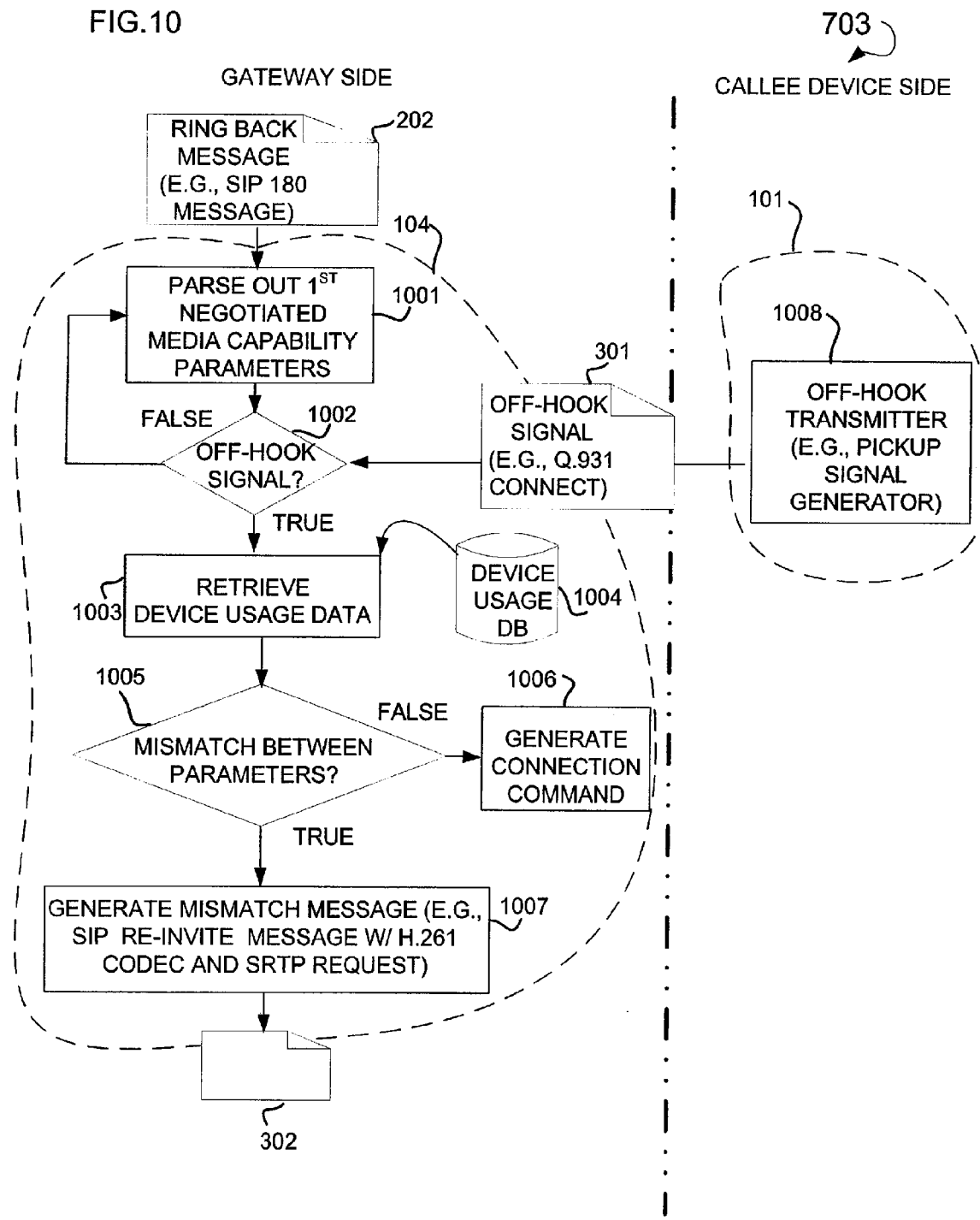

UTILIZATION OF MEDIA CAPABILITIES IN A MIXED ENVIRONMENT

FIELD

This application relates to a system and method for renegotiating media capabilities in shared access network.

BACKGROUND

Systems and methods using Voice over Internet Protocol (VoIP) technology include a network with various devices operatively coupled to this network. Each of these devices may use one or more Compression/Decompression (CODECs) algorithms to encode or decode a digital data stream or signal. These CODECs may allow for a higher or lower rate of compression and may be more or less efficient on this basis.

BRIEF DESCRIPTION OF DRAWINGS

The present invention is illustrated by way of example and not limitation in the figures of the accompanying drawings, in which like references indicate similar elements and in which:

FIG. 7 is flowchart illustrating a method used to generate a mismatch message wherein a mismatch exists between various media capability parameters, according to an example embodiment.

FIG. 8 is a flowchart illustrating a method used to execute an operation that facilitates the receiving of a setup request containing various acceptable media capability parameters including CODECs that are transmitted by a caller, according to an example embodiment.

FIG. 9 is a flowchart illustrating a method used to implement an operation that determines the media capability parameters for the various devices attached to the line side of a gateway, according to an example embodiment.

FIG. 10 is a dual stream flowchart illustrating a method used to implement an operation that conducts a media capability mismatch analysis, according to an example embodiment.

DESCRIPTION OF EXAMPLE EMBODIMENTS

Figure 1:
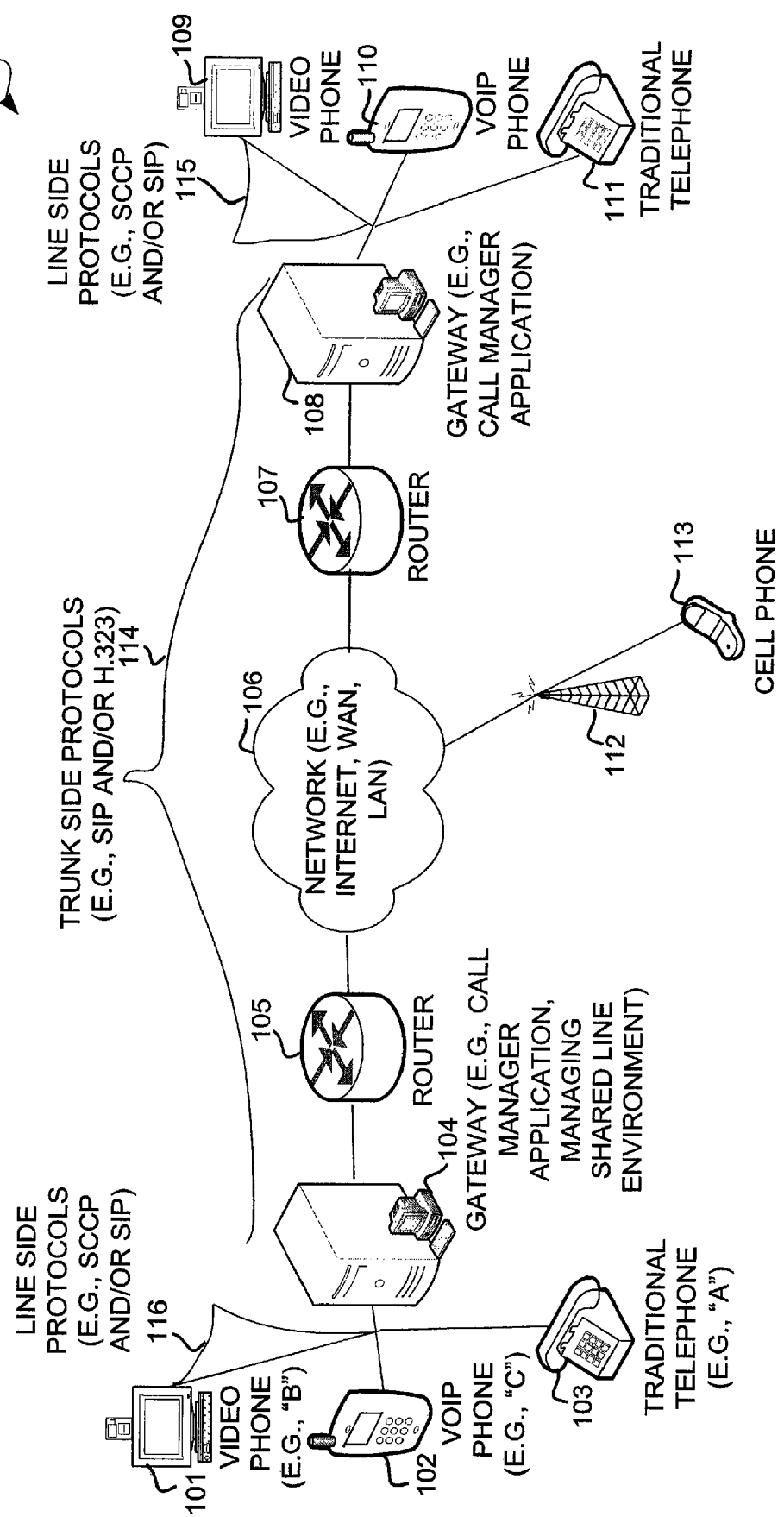
FIG. 1 is a diagram of a system illustrating a VoIP network in the various protocols associated with this network, according to an example embodiment.

In the following description, for purposes of explanation, numerous specific details are set forth to provide a thorough understanding of an embodiment of the present invention. It may be evident, however, to one skilled in the art that the present invention may be practiced without these specific details.

Overview

In one embodiment, a method is illustrated comprising receiving an invite to establish a connection between a caller endpoint device and one of a plurality of callee endpoint devices of a shared line, identifying an initial common media capability between the caller endpoint device and the plurality of endpoint devices, negotiating a connection between the caller endpoint device and the callee endpoint device using the common media capability, determining if the caller endpoint device and the callee endpoint device have a common enhanced media capability, and re-negotiating the connection using the enhanced media capabilities when the caller endpoint device and the callee endpoint device have the common enhanced media capability.

Example System and Method Relating to the Utilization of a Media Capability in a Mixed Environment The Internet has been described as a collection of protocols, where each one of these protocols helps to facilitate communication between, for example, various devices (e.g., including network appliances), networks, and applications. With respect to devices that facilitate VoIP communications, in addition to the Internet Protocol (IP), a number of other application-level protocols may be used to facilitate such a form of communication. These protocols are generally described in the Transmission Control Protocol/Internet Protocol (TCP/IP) stack model, and/or the Open Systems Interconnection Basic Reference (OSI) model illustrating the various layers of abstraction that may be used to illustrate the protocols the make up the Internet. Within the VoIP context, the protocols may be divided up into trunk side protocols (e.g., protocols covering the transmission of data from one gateway to another gateway), and line side protocols (e.g., protocols covering the transmission of data from a gateway to device or end point. These protocols are application level protocols and can include, for example, a Session Initiation Protocol (SIP), the H.323 protocol, and/or the Skinny Client Control Protocol (SCCP) that are used to set up a VoIP session (e.g., a phone call or video call). Further application level protocols may include the Real-time Transport Protocol (RTP), or the Secure Real-time Transport Protocol (SRTP) both of which may be used in the actual transmission of the data (e.g., voice and/or audio data) arising from a VoIP session. Moreover, in certain cases these protocols may be used in conjunction with a Foreign Exchange Station (FXS) interface further using Digital Signal Processing (DSP).

In addition to facilitating the transport of audio and/or video data in the form of data packets, these protocols may be used to transport various CODEC identifiers. These CODEC identifiers may be a series of American Standard Code for Information Interchange (ASCII) based symbols in the case of the SIP protocol, or various Abstract Syntax Notation One (ASN.1) based symbols in the case of H.323. The CODEC that these identifiers may identify may include G.711, G.726-32, GSM, G.723, DVI4, LPC, PCMA, G.722, L16, QCELP, CN, MPA, G.728, G.729, GSM-HR, GSM-EFR, L8, RED, VDVI, CelB, JPEG, H261, MPV, MP2T, H.263. With regard to SIP and H.323 in particular, CODECs such as G.711 and H.261 maybe used.

Not all devices support all CODECs, and devices with vastly different capabilities may, for example, share a common line. For example, devices that are audio only devices may only support the G.711 CODEC (e.g., a VoIP phone), while devices that are both audio and video in nature (e.g., a VoIP video phone) may support not only the G.711 CODEC, but also the H.261 CODEC for video encoding. In the VoIP network setting, it is commonly the case that where multiple VoIP devices are served by the same network appliance (e.g., a gateway, router etc.), a lowest common CODEC approach is used set the CODEC to be initially used by all devices operatively coupled to the network appliance. For example, if a VoIP phone and VoIP video phone are operatively coupled to a gateway, then the G.711 CODEC may be the CODEC that is initially used to decode and encode incoming data.

In some embodiments, the negotiated media capabilities of a first caller end point, and a second callee end point may be based on such considerations as:
  the network protocol layer capabilities negotiation (after bandwidth determination);
  the capabilities negotiation during the bridge of the call;
  the end point specific properties in supporting a VoIP call (e.g., whether SRTP or only RTP supported);
  the bandwidth permitted in the system (e.g., the existence of a local bandwidth cap).
Through using the data collected by addressing these considerations, a mismatch between media capability parameters may be determined.

Some example embodiments may include various media capability parameters that define what is included in a description of a media capability, or a common media capability between two or more devices. For example, in the context of audio media (e.g., audio media capabilities) these parameters may include CODEC type, CODEC payload length, CODEC specific parameters, Voice Activity Detection (VAD), Dual-Tone Multi-Frequency (DTMF) relay mode, or even DTMF relay CODEC. Moreover, in the context of data media (e.g., data media capabilities) these parameters may include fax rate, fax payload length, fax payload format, Modified Modified READ (MMR), fax transport, fax encoding, parameters, modem mode, and modem CODEC, just to name a few of the parameters. Additionally, various video media (e.g., video media capabilities) parameters may also exist including CODEC type, RTP pay load format, and CODEC specific info. In addition to parameters relating to audio, data, and video certain security media (e.g., security media capabilities) parameters may also exist such as crypto capability, crypto suites, key, and key length. (See also RTP and SRTP and the above illustrated CODECs that might be associated with these protocols).

In certain cases, the media capabilities of an end point may dictate the characters of a media path. There is also a possibility to have those end points with different media capabilities sharing a single destination identifier (e.g., an extension). A shared line case could be a simple example, while a hunt group could be another. When an incoming call ringing/alerting at a particular shared line extension, the optimal end-to-end media capabilities for both end points might not be well determined until the physical answering end point reacted to the request. Many times, the media capability established (e.g., the CODEC negotiated for use by the endpoint) might not be the best that could be used. Further, as a result of not using one particular CODEC versus and other a VoIP call might get dropped due to the mismatch of media capabilities from both end points. The answer to the question of what are the best media capabilities that could be selected, is somewhat obvious among protocols relating to inter-working and supplementary services (e.g., possibly hairpin/rotary calls). This answer is not so obvious with regard to VoIP based calls, and, in particular, when seeking an answer to the problem of the dropping of a VoIP call due to a mismatch may occur where, for example, local bandwidth cap is exceeded.

In some embodiments, a shared line environment may be, for example, an environment where a number of different callee endpoint devices share the same single extension (e.g., a phone number). These callee endpoint devices may or may not share the same physical line. One example may be the case where the same single extension is used by a VoIP phone, a video phone, and a traditional telephone all located at different physical locations.

Some example embodiments may include a system and method for providing detection, resolution, and media re-negotiation among a suite of peer to peer VoIP protocols to ultimately use these media capabilities in a mixed end points environment. Re-negotiation may be used to prevent the mismatch of the media capabilities and the parameters contained therein that may result in, for example, an over subscribe scenario, a service drop, or one way media situation. For example, the method may include a mechanism to detect the mismatch of an already negotiated media capabilities at the time of answering (e.g., an off hook or pick up time for example) of the called end point (e.g., callee), an algorithm to determine which CODEC to proceed (e.g., this determination may be based upon a user preference, or may be auto selected based upon a training data set of historical data used in conjunction with a best guess algorithm), and a media re-negotiation scheme to cover the suite of the VoIP protocols for best using the media capabilities for both the end points. This system and method may also apply to dynamically switching among the shared lines and supplementary services.

In some embodiments, where a mismatch is deemed to exist, a common CODEC may be determined that all end points (e.g., callee devices) share in common. This common CODEC may be a best common CODEC, a lowest common CODEC, or even a highest common CODEC (e.g., a highest common factor). A best common CODEC may be, for example, a CODEC that, relative to other available CODECs, provides the best VoIP call quality for the lowest cost with the best security and least bandwidth consumption (see e.g., 403 below). A lowest common CODEC may be supported by all callee devices, but may not be able to exploit all of the functionality associated with all of these devices. In contrast, the highest common CODEC may be able to exploit the functionality, but do so at a cost, in terms of bandwidth, that is prohibitive (e.g., it exceeds certain local bandwidth limitations). This system and method will be more fully illustrated below.

In one embodiment, a list of CODECs is provided by a first gateway managing one or more callee devices. These CODECs may include, for example, the G.711 and G.729 CODECs. A second gateway managing one or more caller devices may respond to the list of CODECs provided by the first gateway through providing a second list of CODECs that does not include G.711 or G.729 as supported CODECs (e.g., the second gateway may provide a second list with H.261 alone as a CODEC that it supports). In response to this second list, the first gateway may need to make a determination as to whether the CODECs outlined in the second list are supported, and, if supported, whether an upgrade or downgrade of bandwidth is required. For example, if the second list contains the H.261 CODEC, then a mismatch determination may need to be made by the first gateway as to whether enough bandwidth exists to support this CODEC and if an upgrade of bandwidth is necessary. Further, a mismatch determination may need to be made as to whether a downgrade of bandwidth may be required.

Some example embodiments may include certain instances where a re-negotiation of CODECs occurs at pickup time resulting in a mismatch determination. For example, in certain cases, a callee device managed by the first gateway picks up a VoIP call, wherein this callee device is capable of handling types of data using more bandwidth than the data and CODEC initial negotiated (e.g., the device picking up can handle video (H.261), but the negotiated CODEC is only audio (G.711)). Based upon this pick up of a VoIP call, a new CODEC and/or bandwidth usage determination is made, and an upgrade or downgrade of bandwidth for the VoIP call provided. Once the bandwidth usage determination is made, the CODECs used by the first and second gateways may need to be re-negotiated as previously illustrated.

Example embodiments may include a way to upgrade or downgrade a VoIP call, given certain circumstances associated with the call and rules (e.g., a service level agreement embodied in an administrative rule set) governing these circumstances. For example, an international VoIP call may not be upgraded due to the cost associated with such an upgrade. Further, 800, 888 or other toll free numbers (e.g., numbers with a toll free prefix or area code) may not receive an upgrade. Additionally, in certain cases, a user may require that an upgrade occur for a particular callee device or even a caller.

An Example System

FIG. 1 is a diagram of an example system 100 illustrating a VoIP network in the various protocols associated with this network. Illustrated is a video phone 101, a VoIP phone 102 and a traditional telephone 103 (e.g., a land-line based, and/or analogue based telephone) that are operatively coupled to a gateway. In some cases, this gateway may be a computer system running a call manager application such as Cisco Systems Inc.'s CALL MANAGER™ application. In some embodiments, the various end points (e.g., 101, 102, and 103) may all share the same line (e.g., a shared line environment) operatively coupled to the same gateway 104, or they may have different lines (e.g., a multi-line environment) each of which is operatively coupled to the same gateway 104. In certain cases these various end points (e.g., 101, 102, and 103) may all share the same line even though they all may have vastly different capabilities and requirement in terms of the CODECs, bandwidth, and security requirements. The protocol used to transmit data between the various devices 101 through 103 may include various line side protocols such as, for example, SCCP and/or SIP. Further illustrated is a router 105 that is operatively coupled to the gateway 104. This router may be, for example, a session border controller, a switch, bridge, or other type of device used to route network traffic. This router 105 may be operatively coupled to or a part of a network 106 where in this network 106 may be, for example, the Internet, a Wide Area Network (WAN) and/or a Local Area Network (LAN). Further, this network 106 may be operatively coupled to a router 107. In some cases, this router 107 may be a session border controller, a switch, a bridge, or some other device used to route network traffic. Operatively coupled to the router 107 is a further gateway 108. Additionally, the gateway 104 and router 105 may reside on one and same devices. Further, the router 107 and the gateway 108 may also reside on one and the same devices. This gateway 108 may be a computer system upon which resides a call manager application such as Cisco Systems Inc.'s CALL MANAGER™ application.

Operatively coupled to this gateway 108 may be, for example, a video phone 109, a VoIP phone 110 and/or a traditional telephone 111. Further, various protocols such as line side protocols may be used to route and otherwise direct traffic between the gateway 108 and the various devices 109 through 111. These line side protocols may include the previously illustrated SCCP and/or SIP. Further, various trunk side protocols may be used to govern or route data between the gateway 104 and the gateway 108 over the network 106. These various trunk side protocols may include, for example, the previously illustrated SIP and/or the H.323 protocol. Further, a wireless transmitter 112 may additionally be operatively coupled to the network 106 wherein this wireless transmitter 112 may be a cellular phone transmission tower using, for example, a Code Division Multiple Access (CDMA) protocol and associated network. A cell phone 113 may be receiving signals from this wireless transmitter 112.

In some embodiments, the gateway 108 could be a plurality of gateway devices, or even logical gateway devices, that are organized into some hierarchical structure. In such an example, one gateway device may manage and control other gateway devices. Further, this hierarchy may be part of some type of structure utilizing routers or other network appliances containing gateway logic.

Figure 2:
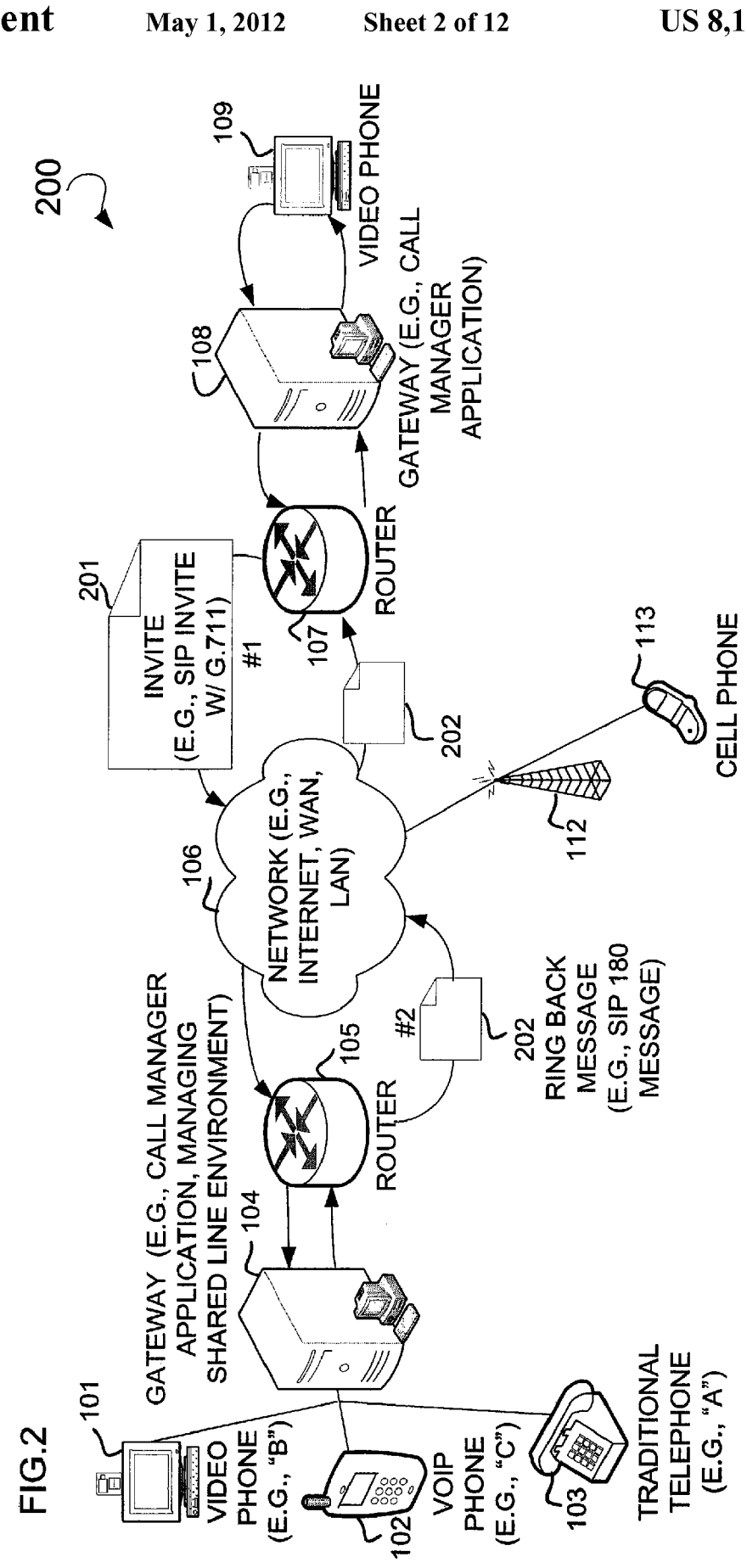
FIG. 2 is a diagram of a system illustrating the setup of a VoIP session, according to an example embodiment.

FIG. 2 is a diagram of an example system 200 illustrating the setup of a VoIP session. Illustrated is an invite 201 that, in some cases, may be based on either the SIP or H.323 protocol. Contained within the invite 201 request may be a description of various CODECs that may be used during the VoIP session. These CODECs may include, for example, the G.711 CODEC. This invite 201 may be initiated by a video phone 109 and may be communicated with the gateway 108 and a router 107 such that the invite 201 is sent over a network 106 to be routed by a router 105 and ultimately sent to a video phone 101 via the gateway 104. In some cases, the gateway 104 may know certain parameters (e.g., multiple media parameters in the form of, for example, the various supported CODECs,) and/or data regarding each one of the devices (e.g., 101-103) that are operatively coupled to it.

These parameters may include bandwidth requirements, CODEC requirements, encryption requirement (e.g., SRTP) and other types of information relevant for each one of the devices 101 through 103. Once the gateway 104 receives the invite 201, a ring-back message 202 is sent back across the network to ultimately the gateway 108 to be distributed to, for example, the video phone 109. This ring-back message 202 may provide a call signal to the video phone 109 in the form of a SIP 180 message, wherein, once this message is received by the gateway 108, a ringing message is sent by the gateway 108 to the video phone 109 that it manages. Also contained in this ring-back message 202 may be information relating to the CODECs supported by the callee device. Once the gateway 108 and/or video phone 109 receives the ring-back message 202, data is transmitted back across the network 106 to be ultimately received by the caller device, such as here, the video phone 101. This data may be in the form of, for example, audio or video data. In the example presented, the data would be audio data confirming the use of the negotiated G.711 CODEC.

Figure 3:
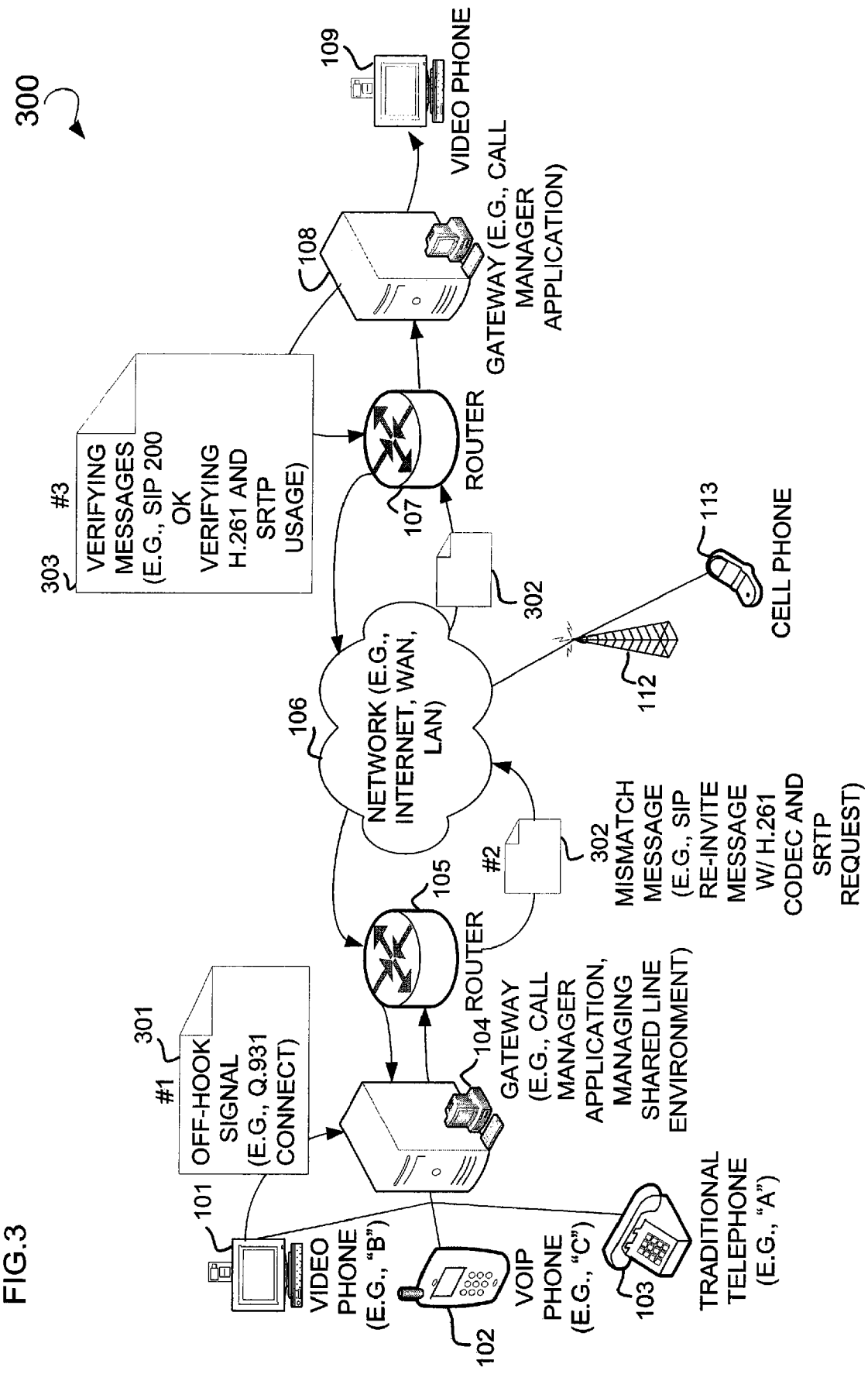
FIG. 3 is a diagram of a system illustrating the need for a change in media capability parameters based on an anticipated or actual media stream use, according to an example embodiment.

FIG. 3 is a diagram of an example system 300 illustrating the need for a change in CODECs based on an actual or anticipated media capability or use. In some embodiments, this example system 300 reflects the implementation of a media re-negotiation scheme. Illustrated is an off-hook signal 301 that may be in the form of a Q.931 CONNECT signal generated by an individual picking up or otherwise using a device such as the video phone 101. Once this device is picked up, or otherwise activated, a signal is sent to the gateway 104 informing the gateway 104 that the video phone 101 is responding to the invite 201. By virtue of the video phone 101 responding to the invite 201, one or more different media capability parameter, such as a different CODEC, may be utilized. These media capability parameters may differ from those initially negotiated for by the gateways 104 and 108 and may require a re-negotiation of media capability parameters. This is especially the case given that G.711 CODEC initially agreed upon (see FIG. 2) is an audio only CODEC, and a video phone uses video CODECs such as H.261 in addition to audio CODECs such as G.711.

Once the off-hook signal 301 is received, a bandwidth upgrade or downgrade determination is made. In some cases an upgrade of bandwidth may be required where the callee device responding to the invite 201 is a video phone (e.g., video phone 101) as compared to a traditional telephone 103. This is due to the fact that the bandwidth requirements for a video phone 101 are much higher than those for a traditional telephone 103. If hypothetically, however, the caller device was a video phone such as video phone 109, and the callee device responding to the invite was a traditional telephone 103, then a downgrade of bandwidth would need to be implemented.

Once the bandwidth requirements are determined based on the responding call device, a mismatch analysis is conducted and a mismatch message 302 is sent to the caller gateway (e.g., gateway 108). This mismatch message 302 may be, for example, a SIP re-invite message or even an H.323 Empty Capabilities Set (ECS) message. Contained within this message may be a request to tear down an existing session created as a result of the invite 201, and the creation of a new session including a session description (e.g., using a Session Description Protocol (SDP) in the case of SIP) outlining various media capability parameters including CODEC requirements, security requirement (e.g., the use of SRTP) and other parameter based requirements. After the mismatch message 302 is sent to the caller gateway (e.g., 109), a verifying messages packet 303 is sent back to the callee gateway (e.g., 104) that issued the mismatch message 302. This verifying messages packet 303 may contain, for example, a SIP 200 OK message. This verifying message packet 303 may serve as a form of acceptance message wherein the media capability parameters outlined in the mismatch message 302 are accepted.

In some embodiments, a similarity analysis may be used in combination with the mismatch analysis such that similarities between the media capabilities of a caller endpoint (e.g., video phone 109) and a callee endpoint (e.g., video phone 101) is determined. Put another way, rather than determining where the media capabilities are different, a determination is made regarding where these capabilities are similar. This similarity analysis could be used as part of operation 703 illustrated below.

Figure 4:
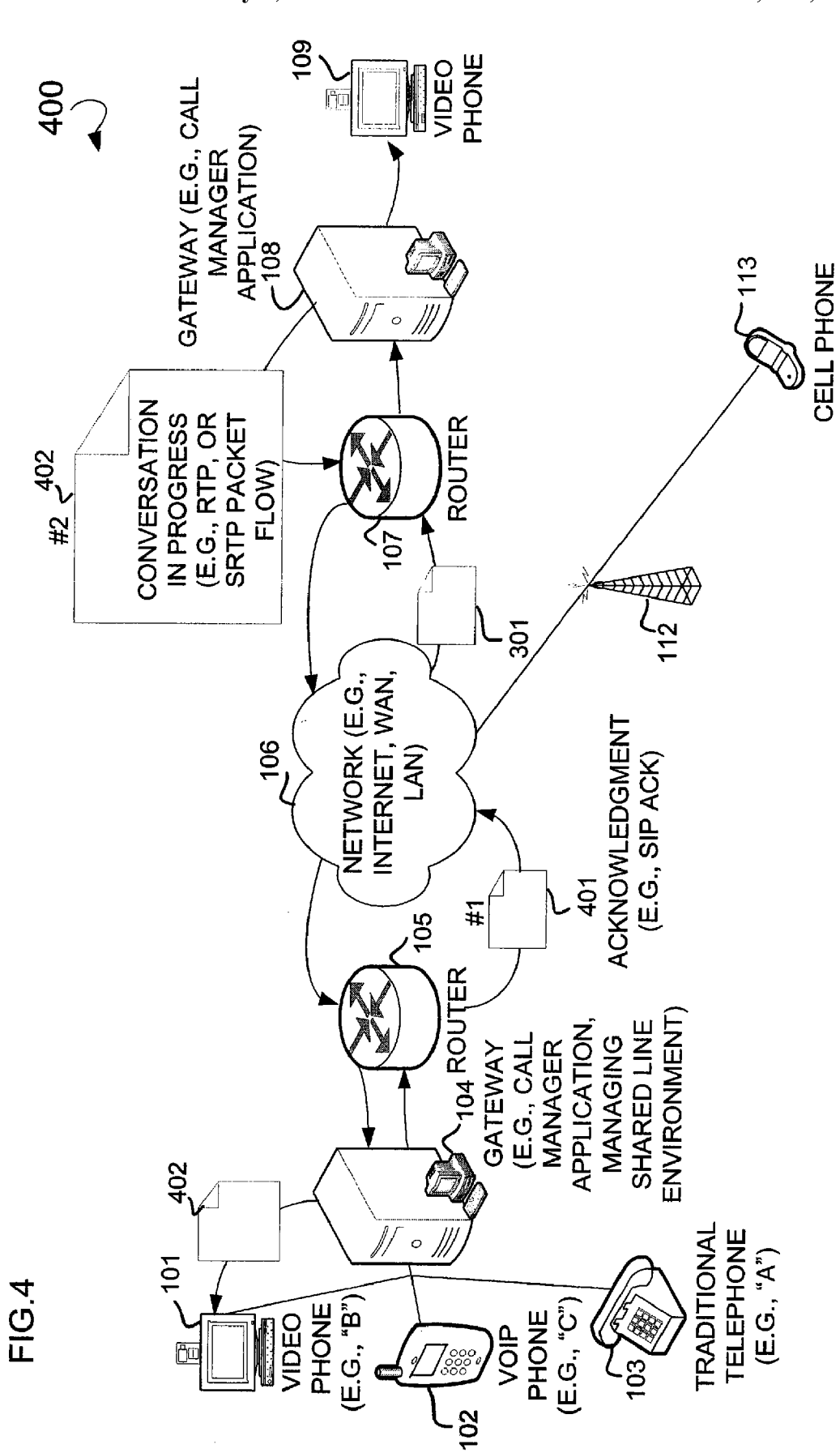
FIG. 4 is a diagram of a system illustrating the acknowledgment and initiation of a conversation over a VoIP network, according to an example embodiment.

FIG. 4 is a diagram of an example system 400 illustrating the acknowledgement of the mismatch message 302 and the creation of a new media flow based upon the responding callee device. Illustrated is an acknowledgement 401 (e.g., a SIP ACK packet) sent by the gateway 104 to the gateway 108 across the network 106. Once received by the gateway 108, a media flow or media session may begin such that a VoIP based telephone, video phone, or other type of conversation may take place (see e.g., conversation 402).

Example Logic

Figure 5:
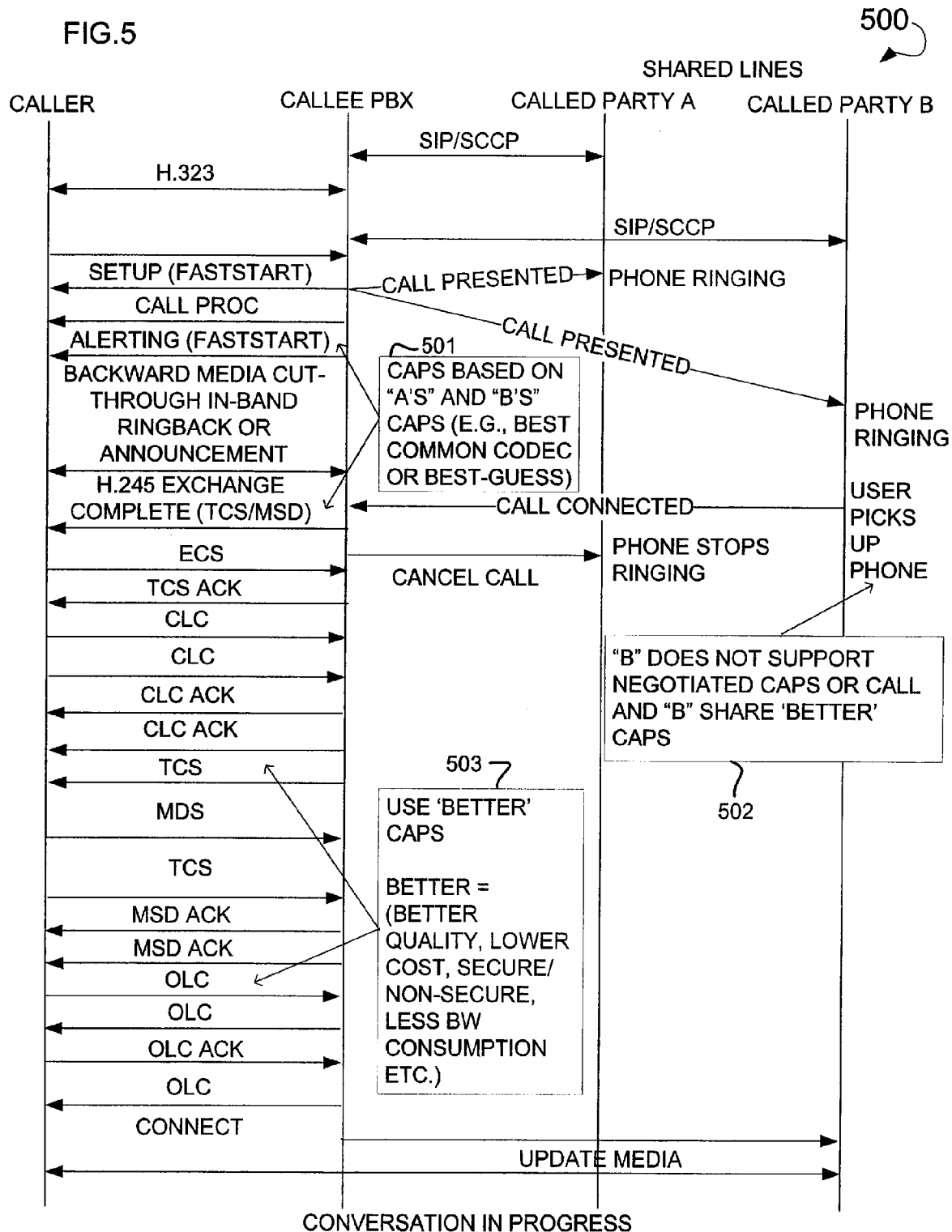
FIG. 5 is a sequence diagram of a VoIP session illustrating the use of the H.323 protocol, according to an example embodiment.

FIG. 5 is a sequence diagram of an example VoIP session illustrating the use of the H.323 protocol. Illustrated is a caller such as, for example, the video phone 109, VoIP phone 110 and/or traditional telephone 111, a callee PBX or Private Branch Exchange, such as gateway 104, a called party A such as the traditional telephone 103 and a called "B" such as the video phone 101. In some cases, the callee PBX may be an Internet Protocol Branch Exchange (IPBX). Illustrated is a description 501 illustrating the setting of certain types of CODEC caps based upon devices such as the traditional telephone 103 and/or video phone 101 wherein these CODEC caps as referenced in 501 are transmitted by a callee PBX such as the gateway 104. These CODEC caps may be based on some type of best guess or other predictive method or algorithm used to predict which device (e.g., 101-103) may be most likely to respond to data generated as a result of the initiation of the VoIP session. These CODEC caps as illustrated may be transmitted as a part of the alerting function of the H.323 protocol or the H.245 portion of the H.323 protocol wherein data is transmitted from the callee PBX or IPBX to the caller.

In some cases, after an initial CODEC has been determined (e.g., a lowest common CODEC for the various called devices (e.g., 103 and/or 101)) a mismatch will be determined to exist wherein the actual device that uses the data arising from the VoIP session can handle a higher level CODEC. In such cases where a mismatch exists, then a best common CODEC (e.g., a higher level CODEC) may have to be negotiated. This negotiation is illustrated in description 502. In certain cases, this higher level CODEC may be transmitted as a part of, for example, a Terminal Capability Set (TCS) transmission that is a part of H.323 protocol and/or may be transmitted as a part of an Open Logic Channel (OLC). The notion of a mismatch may not only be predicated upon which device may more than likely respond to the data generated by the VoIP session and the capabilities of that device, but may also be based on concepts such as quality, lower cost, security, the lack of security, bandwidth consumption, or other considerations with regard to the use of the lowest common CODEC vis-à-vis the best common CODEC based on what is the CODEC that is most likely to be used. Description 503 illustrates some of the media capability parameters used to determine a best common CODEC.

Figure 6:
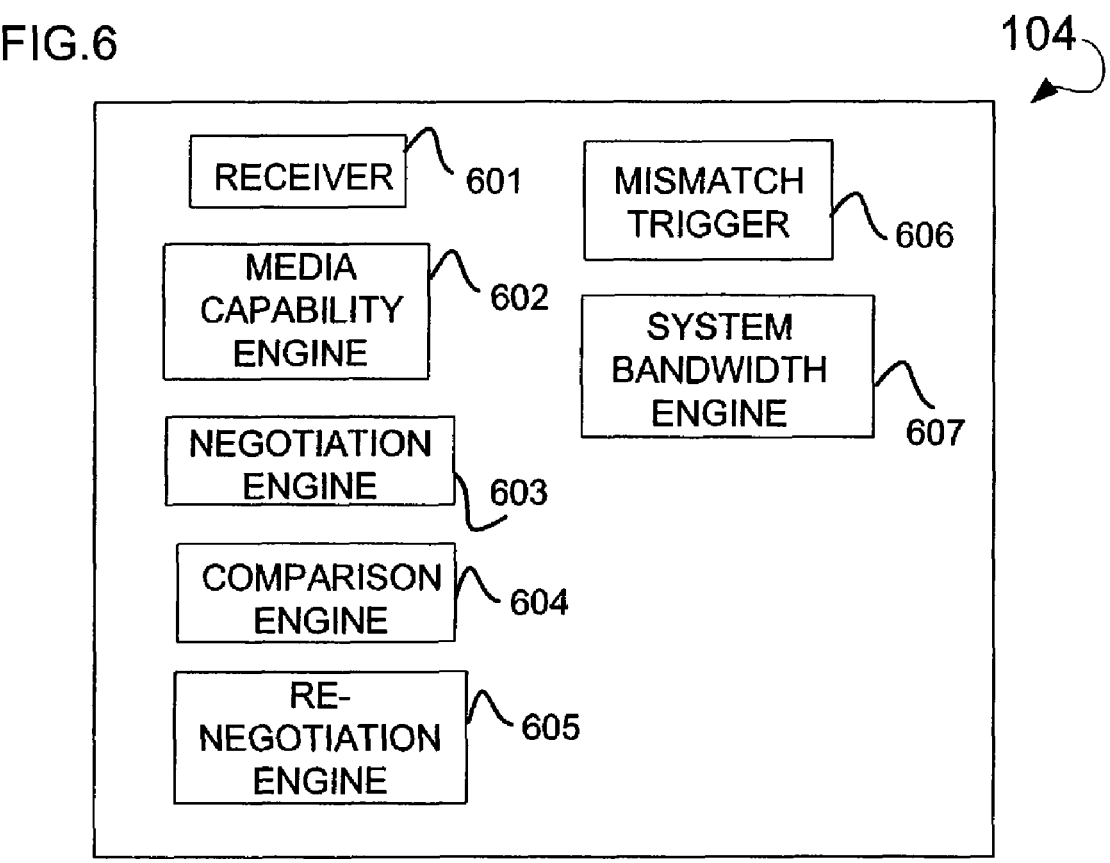
FIG. 6 is a block diagram of a gateway illustrating various blocks that may reside as part of this gateway, according to an example embodiment.

FIG. 6 is a block diagram of an example gateway 104 illustrating various blocks that may reside as part of this gateway, or even as part of some other network device such as a router, switch, bridge, or other suitable network device or appliance. These blocks may be implemented in hardware, firmware, or even software. Illustrated is a network device including a receiver 601 to receive an invite to establish a connection between a caller endpoint device and one of a plurality of callee endpoint devices of a shared line, a media capability engine 602 to identify an initial common media capability between the caller endpoint device and the plurality of endpoint devices, a negotiation engine 603 to negotiate a connection between the caller endpoint device and the callee endpoint device using the common media capability, a comparison engine 604 to determine if the caller endpoint device and the callee endpoint device have a common enhanced media capability, and a re-negotiation engine 605 to re-negotiate the connection using the enhanced media capability when the caller endpoint device and the callee endpoint device have common the enhanced media capability. Further, in some cases, at least two of the plurality of callee endpoint devices have different media capabilities. Additionally, the initial common media capability may include identifying a lowest media capability common to the plurality of callee endpoint devices. Moreover, the common enhanced media capability may include predicting an optimal media capability. The optimal media capability may be at least one of a higher quality media connection, a lower bandwidth consumption connection, or a secure connection. The common media capability may include a CODEC algorithm that is initially negotiated during the establishment of the connection. The initial common media capability may be an audio capability, and the enhanced media capability may be a video capability. Additionally, the plurality of callee endpoint devices may include a single destination identifier. Moreover, the common enhanced media capability may include at least one of a video media capability, an audio media capability, a data media capability, or a security media capability.

In some embodiments, the network device may include a system bandwidth engine 607 to set a VoIP system allowed bandwidth, the VoIP system allowed bandwidth based upon at least one of a service level agreement, or a user selected preference in the form of a voice system configuration value. Moreover, the network device may include a mismatch trigger 606 to initiate a mismatch analysis using an off-hook signal, the off-hook signal identifying the callee endpoint device. The mismatch may be a difference in media capabilities. Further, the mismatch analysis may use a user defined preference to determine the existence of the mismatch. Additionally, the mismatch analysis may use an auto-select feature to implement a service level agreement.

Some example embodiments may include an enhanced media capability, wherein the enhanced media capability is a media capability of a first callee device that when compared to the media capability of a second callee device, wherein both the first and second callee devices are part of the same shared line environment, is more robust, scaleable and able to handle a CODEC requiring a higher bandwidth. In some embodiments, the term enhanced may even denote a less robust and scaleable CODEC.

Some embodiments may include an algorithm as reflected in the below pseudo-code to determine the bandwidth capabilities of a network and whether a particular CODEC may be supported by a callee device. Example embodiments may include the implementation of this pseudo code just prior to the determination of a media capabilities parameters mismatch:

```
negotiated_cap // the negotiated capability (it's from capability exchange)
local_support_cap // the answering end point capability
if(negotiated₁₃ cap EQUAL TO local_support_cap) {
    /* the end point capability matches to the negotiated caps */
    /* do nothing just uses whatever it is */
    return (negotiated_cap);
} else {
    /* the end point caps is different from the negotiated caps */
    /* check how the capabilities was negotiated */
    if(VoIP call) {
        /* it's VoIP call */
        if(negotiated_cap is more than the local_support_cap) {
            /* It's VoIP call and the local_support_cap can not fully */
            /* support the negotiated_cap. */
            /* We need to re-negotiate the remote end point to downgrade */
            /* to meet the local_support_cap */
            /* use resume call to do the re-negotiation */
            issue VoIP protocol specific media negotiation to downgrade
            remote end point to meet the need of local_support_cap;
            return (local_support_cap);
        } else {
            /* it's VoIP call and local_support_cap is more than
            negotiated_cap */
            if(the "system allowed bandwidth" can support
            local_support_cap) {
                /* issue VoIP protocol specific media negotiation to upgrade */
                issue VoIP protocol specific media negotiation to upgrade
                remote end point to meet the need of local_support_cap;
                return (local_support_cap);
            } else {
                /* the "system allowed bandwidth" can NOT support
                local_support_cap */
                /* we use the negotiated_cap and down grade the local call */
                return (negotiated_cap);
            }
        }
    } else {
        /* it's local call, upgrade if possible, assuming the local bandwidth is
        unlimited */
        if(local_support_cap is more than the negotiated_cap) {
            /* it's local call, could be upgrade to secure call, */
            /* assuming the local bandwidth is unlimited */
            return (local_support_cap);
        } else {
            /* it's local call but the local_support_cap can not fully support */
            /* the negotiated_cap. */
            /* downgrade to meet the need of local_support_cap */
            return ((local_support_cap);
        }
    }
}
```

In some embodiments, the return value of this algorithm is the media capability of an endpoint (e.g., callee device) and/or VoIP system as expressed via a THIS call (e.g., a THIS function call). In certain cases, bandwidth in terms of local support caps, negotiated caps, and the like may be based on service level agreements between market participants and/or a voice system configuration.

FIG. 7 is flowchart illustrating an example method 700 used to generate a message mismatch 302, wherein media capability mismatch is determined. Illustrated are various operations (e.g., 701-704) that may reside on or as a part of, for example, a gateway using for example a call management application. Illustrated is an invite 201 containing, for example, the G.711 CODEC. The invite 201 is received via the execution of an operation 701 that facilitates the receiving of the setup request containing various acceptable CODECs and other media capability parameters that are transmitted by, for example, a caller (e.g., 109-111). Next, an operation 702 is executed that determines the media capabilities for the various devices attached to the line side of the gateway such as gateway 104. These various capabilities may be, for example, a VoIP audio capability, a VoIP video capability, and/or a VoIP audio/video capability. Further, an operation 703 is executed that conducts a mismatch analysis such that a determination is made as to whether the media capability parameters contained in the invite 201 may be accommodated by the media capabilities of the device that responds to or that is most likely to respond to the VoIP call. Additionally, an operation 704 may be executed that transmits a mismatch message (e.g., 302) that includes a re-negotiation command (e.g., a SIP re-invite or H.323 ECS) containing, for example, a new CODEC.

FIG. 8 is a flowchart illustrating an example method used to execute operation 701. Illustrated is an operation 801 that parses a setup request such as invite 201. Once parsed, an operation 802 is executed that extracts required media capability parameter data (e.g., CODEC data for a requesting endpoint) where a requesting endpoint may be a caller such as one or more of the various devices 109, 110, and/or 111. An operation 803 may then be executed that may set media capabilities based upon a required parameter (e.g., in certain instances, certain media capabilities must be used based upon service agreements or other considerations).

FIG. 9 is a flowchart illustrating an example method used to implement operation 702. Illustrated is an operation 901 that receives a required media capability parameter data (e.g., CODEC data). This required data is then provided to an operation 902 for processing whereby the operation 902 retrieves certain device profiles from a device profile database 906 based on this media capability parameter data. These profiles may include, for example, the various types of CODECs (e.g., the end point specific properties supporting the VoIP call) that may be used by each one of the devices operatively coupled to a gateway, such as gateway 104. Next, an operation 903 is executed that retrieves a network profile from, for example, a network profile database 908. This network profile may contain information relating the network protocol layer capabilities negotiation, the capabilities negotiation during the bridge of the call, the bandwidth permitted in the system, and the information associated with the devices that are part of the network (e.g., routers, bridges, switches, etc). Next, in one embodiment, an operation 904 is executed that generates and transmits a ring-back message (e.g., ring-back message 202) containing, among other things, a common first negotiated media capability (e.g., a best common CODEC, a lowest common CODEC, or even a highest common CODEC) common to the caller device and the callee devices. Example embodiments may further include the storage of this common first negotiated media capability as a trunk side media capability profile into a database such as a device usage database (see e.g., device usage database 1004 illustrated below).

FIG. 10 is a dual stream flow chart illustrating an example method used to implement an operation 703. Illustrated is a first stream titled "Gateway Side" and a second stream titled "Callee Device Side." Residing on the gateway side is a number of operations 1001-1007. Residing on the callee device side is an operation 1008. With regard to the gateway side, a ring-back message 202 is received and processed by an operation 1001. In some embodiments, this ring-back message 202 may be retrieved from a device usage database 1004 in the form of a trunk side media capability profile or may be received from an operation 904. The data from this ring-back message 202 is then parsed and provided to a decisional operation 1002. In cases where decisional operation 1002 evaluated to "false," the operation 1001 is re-executed. Where decisional operation 1002 evaluates to the "true," an off-hook signal 301 is received from executing an off-hook transmitter operation 1008 residing on the callee device 101. In some embodiments, this off-hook transmitter operation 1008 is executed as part of some other VoIP capable device (see e.g., 102 or 103). Where decisional operation 1002 evaluated to "true," an operation 1003 is executed that retrieves device usage data form a device usage DB 1004. This data may include bandwidth usage data over some period of time, or other useful data.

Next, a decisional operation 1005 is executed that determines whether a mismatch exists between certain media capability parameters. Where decisional operation 1005 evaluates to "false," an operation 1006 is executed that generates a command to initiate the connection command through the use of, for example, a SIP 200 OK message. In cases where decisional operation 1005 values to "true," a mismatch between media capability parameters is deemed to exist such that a mismatch message 302 needs to be generated. This mismatch message 302 is then generated through the execution of an operation 1007. As previously alluded to, this mismatch message 302 may be, for example, a SIP re-invite message containing a new CODEC value or values, SRTP requirements, and other changes to the requisite media capability parameters.

Figure 11:
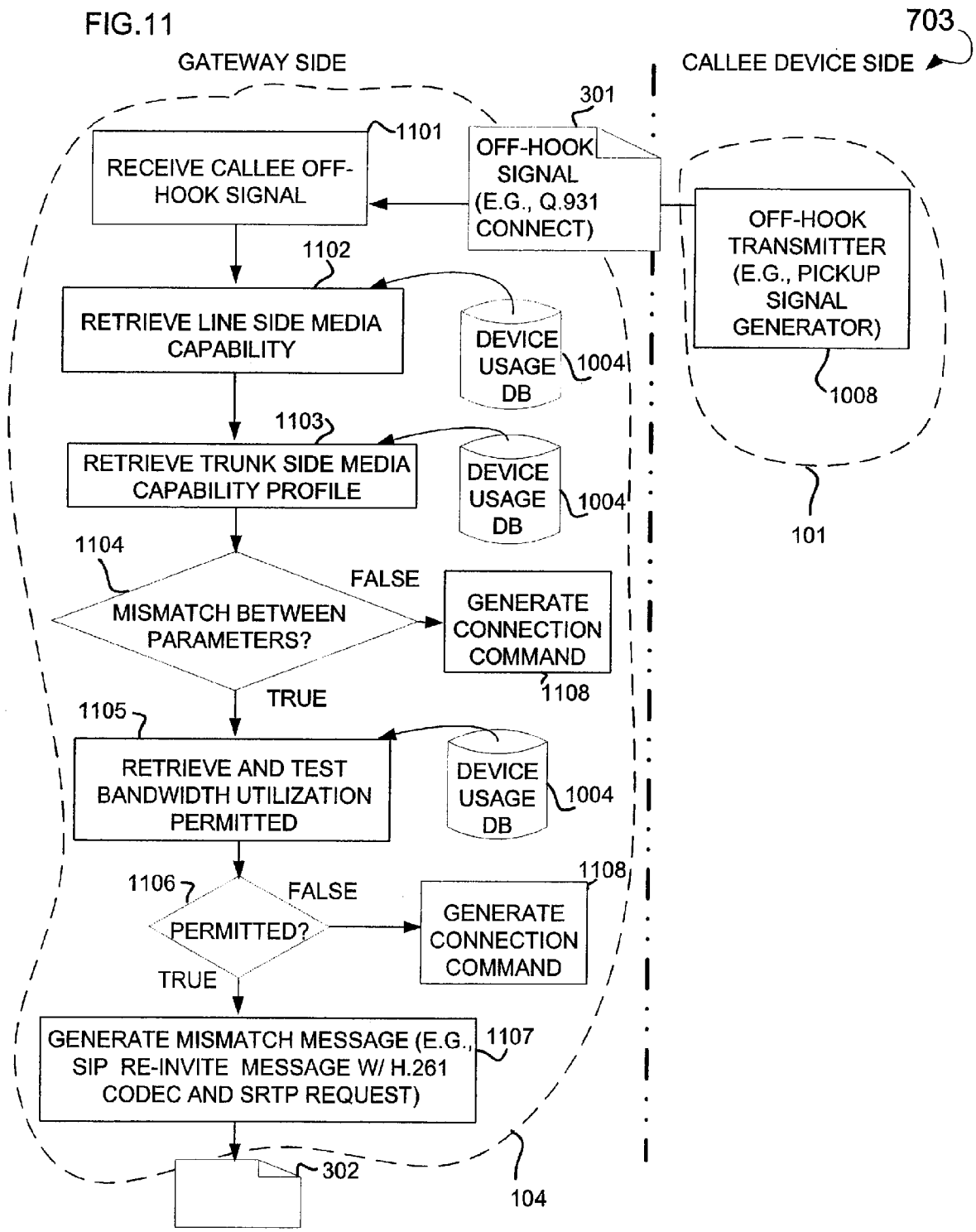
FIG. 11 is a dual stream flowchart illustrating a method used to implement an operation that conducts a media capability mismatch analysis that uses, among other things, an administrative rule set in the determination of whether a particular bandwidth utilization is permitted, according to an example embodiment.

FIG. 11 is a dual stream flowchart illustrating an example method used to implement operation 703 illustrating, among other things, the use of an administrative rule set in the determination of whether particular bandwidth utilization is permitted. According to one example embodiment an operation 1101 is executed that receives an off-hook signal 301 identifying a particular end point device (e.g., 101, 102, or 103). Once this off-hook signal is received, an operation 1102 is executed that retrieves a line side media capability for the identified end point device. This line side media capability is retrieved from a device usage database 1004, and includes data relating to, for example, the CODECs required for the end point device (e.g., 101, 102, or 103), the local bandwidth cap data for this end point devices and other relevant data. Next, an operation 1103 is executed wherein the trunk side media capability profile for a particular media session is retrieved from the device usage database 1004. Once retrieved, a decisional operation 1104 may be used to determine whether a mismatch between the various media capabilities parameters exists. This determination may be made using, for example, the above illustrated pseudo-code and associated algorithm. In cases where decisional operation 1104 evaluates to "false," a generate connection command operation 1108 is executed that is akin to operation 1006. In cases where the decisional operation 1104 evaluates to "true," an operation 1105 is executed that retrieves an administrative rule set from the device database 1004. Using this administrative rule set, a determination can be made as to whether, for example, an upgrade or downgrade of bandwidth is allowed given a particular caller or callee device, or even based upon the caller or callee identity. This determination is made by a decisional operation 1106. In cases where the decisional operation 1106 evaluates to "false," then the operation 1108 is executed. In cases where the decisional operation 1106 evaluates to "true," an operation 1107 is executed wherein a mismatch message 302 is generated.

In some embodiments, a method is illustrated wherein the execution of an operation 701 facilitates the receiving of an invite to establish a connection between a caller endpoint device and one of a plurality of callee endpoint devices of a shared line. Further, the operation 702 is executed to identify an initial common media capability between the caller endpoint device and the plurality of endpoint devices. Next, the operation 702 works to negotiate a connection between the caller endpoint device and the callee endpoint device using the common media capability (e.g., a first negotiated CODEC in the form of a lowest common CODEC). Then the operation 703 is executed to determine if the caller endpoint device and the callee endpoint device have common enhanced media capabilities, and, where necessary, re-negotiating the connection using the enhanced media capabilities. Additionally, the at least two of the plurality of callee endpoint devices may have different media capabilities. Moreover, the identifying of an initial common media capability may include identifying a lowest media capability common to the plurality of callee endpoint devices. Further, the determining of the common enhanced media capabilities may include predicting an optimal media capability, wherein the optimal media capability is at least one of a higher quality media connection, a lower bandwidth consumption connection, or a secure connection. Still further, the common media capability may include a CODECs algorithm that is initially negotiated for during the establishment of a connection. In addition, the initial common media capability may be an audio capability, and the enhanced media capability is a video capability. The plurality of callee endpoint devices may include a single destination identifier. The common enhanced media capabilities include at least one of a video media capability, an audio media capability, a data media capability, or a security media capability. Further, the method may include setting a VoIP system allowed bandwidth, the VoIP system allowed bandwidth based upon at least one of a service level agreement, or a user selected preference in the form of a voice system configuration value.

Some embodiments may include the execution of the operation 703 to facilitate a mismatch analysis using an off-hook signal, the off-hook signal identifying the callee endpoint device. The mismatch may be a difference in media capabilities. Further, the mismatch analysis may use a user selected preference to determine the existence of the mismatch. Moreover, the mismatch analysis may use the auto-select feature to implement a service level agreement.

A Database

Some embodiments may include the various databases (e.g., 906, 908, and 1004) being relational databases, or, in some cases, On Line Analytical Processing (OLAP) based databases. In the case of relational databases, various tables of data are created and data is inserted into, and/or selected from, these tables using a Structured Query Language (SQL) or some other database-query language known in the art. In the case of OLAP databases, one or more multi-dimensional cubes or hyper cubes, containing multidimensional data from which data is selected from or inserted into using a Multidimensional Expression Language (MDX) may be implemented. In the case of a database using tables and SQL, a database application such as, for example, MYSQL™, SQLSERVER™, Oracle 8I™, or 10G™, or some other suitable database application may be used to manage the data. In this, the case of a database using cubes and MDX, a database using Multidimensional On Line Analytic Processing (MO-LAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into a Relational Data Base Schema (RDS) or Object Relational Data Schema (ORDS), as is known in the art. These schemas may be normalized using certain normalization algorithms to avoid abnormalities such as non-additive joins and other problems. Additionally, these normalization algorithms may include Boyce-Codd Normal Form or some other normalization, optimization algorithm known in the art.

Figure 12:
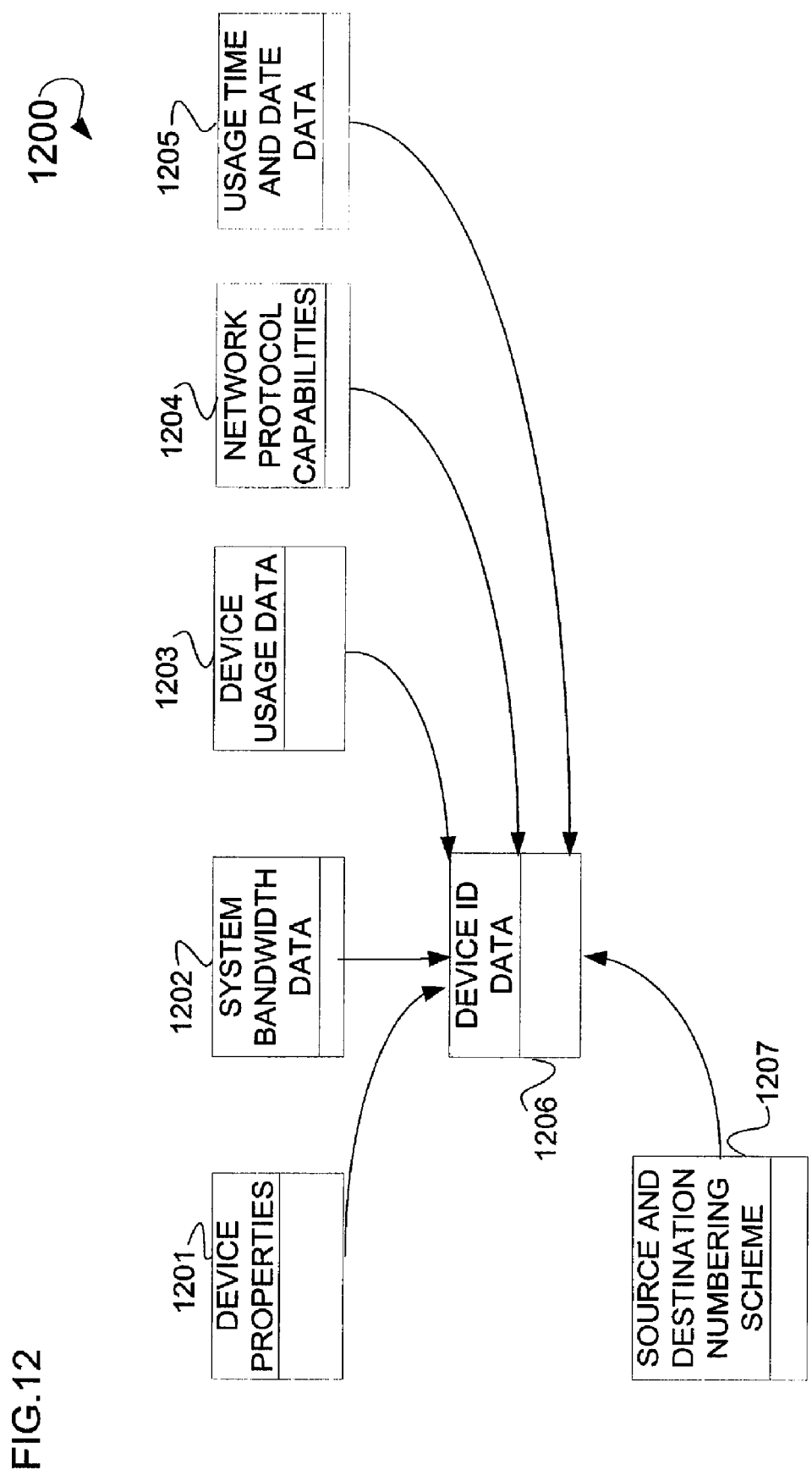
FIG. 12 is a Relational Data Schema (RDS) illustrating some of the various data tables that may be used, according to an example embodiment.

FIG. 12 is an RDS 1200 illustrating some of the various data tables that may be used in the previously illustrated system and method. These data tables may be maintained in, for example, a device profile database 806, a network profile database 807, or even a device usage database 1004. Illustrated is a device properties table 1201 that contains the properties of the various devices that may exist as a called party operatively coupled to, for example, a callee IPBX. This device properties table 1201 may contain tuples relating to, for example, the bandwidth requirements of a device, the CODEC requirements of a device, and other types of data. This data may be formatted using a data type such as, for example, a string, or other suitable data type. Further, a table 1202 is illustrated that contains system bandwidth data. This system bandwidth data may be in the form of data relating to the bandwidth usage for a particular device within the system (e.g., a callee) and may be in the form of, for example, kilobytes, megabits, megabytes, or other types of system bandwidth data. Further, certain types of bandwidth limitation data may also be included within this table 1202 such as, for example, the quality of service data, certain types of threshold limits, and other types of relevant bandwidth limitation information. In the case of the bandwidth information related to bytes, kilobytes, and the like, this data may be stored as, for example, an integer, a float, a double, or some other type of suitable data type. In the cases of bandwidth limitations, this data may be stored as an integer, float, double, and/or even a string in certain cases.

Further illustrated is a table 1203 that contains device usage data. Contained within this table are various tuples relating to the bandwidth usage of a particular device as operatively coupled to the system wherein this device may be, for example, the previously illustrated called parties such as the video phone 101, the VoIP phone 102 or even the traditional telephone 103. This device usage data may be presented in the form of bytes, kilobytes, megabytes, bits, and the like and may be a data type such as double, float, integer, or some other type of numerical data type. Additionally illustrated is table 1204 that contains data relating to network protocol capabilities. In certain cases tuples will be contained in the table 1202 that relate to the capabilities of particular protocols used in the network. These capabilities may include the CODECs that are supported by each of the various protocols. For example, in the case of H.323, CODECs such as G.711 and H.261 may be illustrated and stored as for example a string or other suitable data type. Further, table 1205 is illustrated that contains time and date usage data in the form of various tuples. This time and date usage data may relate to the time and date upon which a particular device, such as the called party devices 101, 102, and/or 103 may be used. Such time and date data may be used to determine whether or not a mismatch exists between the suggested CODEC and the actual CODEC that may be used by the device most likely to respond to the data generated by the VoIP session. The various tuples contained in each one of these tables (e.g., 1201-1205) may be constrained by various device ID data constraints as contained in the table 1206, where these various device ID data constraints provide or exist as unique identifiers for each one of the devices and the associated characteristics and properties of these devices (e.g., date and time data, device usage data, device properties data). Further, certain types of system properties or characteristics may also be made unique by the device ID data (e.g., system bandwidth data network protocol capabilities).

Additionally illustrated is a table 1207 containing data relating to a source and destination number scheme. As previously alluded to, in some cases the phone numbers of source and destination (e.g., a caller and callee devices) are maintained to determine whether an upgrade of a CODEC is necessary or even allowed in certain circumstances. Table 1207 may contain data in the form of tuples relating to source and destination numbers such that these numbers are stored into the table 1207 as a string, integer, or other suitable data type. Further, in some cases, a value may be maintained in the table 1207 to represent whether an upgrade or downgrade is allowed for a particular source and destination number. This value may be a boolean set to, for example, "true" when a number can be upgraded, or "false" when a number cannot be upgraded.

In some embodiments, the data (e.g., tuples) in each of the above described tables reflects the requirements of one or more service level agreements that are used to create an administrative rule set. This administrative rule set may be written in XML and may be used to predetermine the types of calls entitled to an upgrade or downgrade of service. As previously shown, for example, calls involving 800, 888, or other toll free numbers (e.g., numbers with a toll-free prefix or area code) may not receive an upgrade. Additionally, in certain cases, a user may require that an upgrade occur for a particular callee device or even a caller. Other rules governing bandwidth usage may also exist.

A System of Transmission Between a Server and Client

Some embodiments may use the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as the Internet, Local Area Network (LAN), Wide Area Network (WAN), or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Example Embodiment of a Computer System

In some embodiments, the present invention is implemented on a digital processing system or computer system (e.g., a network device) that includes a processor, which may represent one or more processors and may include one or more conventional types of such processors (e.g., x86, x86-64), such as an AMD processor, Intel Pentium processor, or other suitable processor. A memory is coupled to the processor by a bus. The memory may be a Dynamic Random Access Memory (DRAM) and/or may include Static RAM (SRAM). The processor may also be coupled to other types of storage areas/memories (e.g., cache, Flash memory, disk, etc.), which could be considered as part of the memory or separate from the memory.

In some embodiments, a bus further couples the processor to a display controller, a mass memory or some type of computer-readable medium device, a modem or network interface card or adaptor, and an Input/Output (I/O) controller. In some embodiments, the display controller controls, in a conventional manner, a display, which may represent a Cathode Ray Tube (CRT) display, a Liquid Crystal Display (LCD), a plasma display, or other type of suitable display device. Computer-readable medium, in some embodiments, may include a mass memory magnetic, optical, magneto-optical, tape, and/or other type of machine-readable medium/device for storing information. For example, the computer-readable medium may represent a hard disk, a read-only or writeable optical CD, etc. In some embodiments, a network adaptor card such as a modem or network interface card is used to exchange data across a network such as an Internet. In some embodiments, the I/O controller controls I/O device(s), which may include one or more keyboards, mouse/trackball or other pointing devices, magnetic and/or optical disk drives, printers, scanners, digital cameras, microphones, etc.

In some embodiments, the present invention may be implemented entirely in executable computer program instructions that are stored on a computer-readable medium or may be implemented in a combination of software and hardware, or in certain embodiments, entirely in hardware.

Embodiments within the scope of the present invention include computer-readable medium for carrying or having computer-executable instructions or data structures stored thereon. Such computer-readable medium may be any available medium, which is accessible by a general-purpose or special-purpose computer system. By way of example, and not limitation, such computer-readable medium can comprise physical storage medium such as RAM, ROM, Erasable Programmable Read-Only Memory (EPROM), CD-ROM or other optical-disk storage, magnetic-disk storage or other magnetic-storage devices, or any other medium that can be used to carry or store desired program code means in the form of computer-executable instructions, computer-readable instructions, or data structures and that may be accessed by a general-purpose or special-purpose computer system. This physical storage medium may be fixed to the computer system as in the case of a magnetic drive or removable as in the case of an Electronically Erasable Programmable Read-Only Memory (EEPROM) device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or even source code.

In this description and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or PDA) where internal modules (e.g., a processor and memory) work together to perform operations on electronic data.

In some embodiments, the invention may be practiced in network computing environments with many types of computer system configurations, including hubs, routers, wireless Access Points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. The invention can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices (see below).

Figure 13:
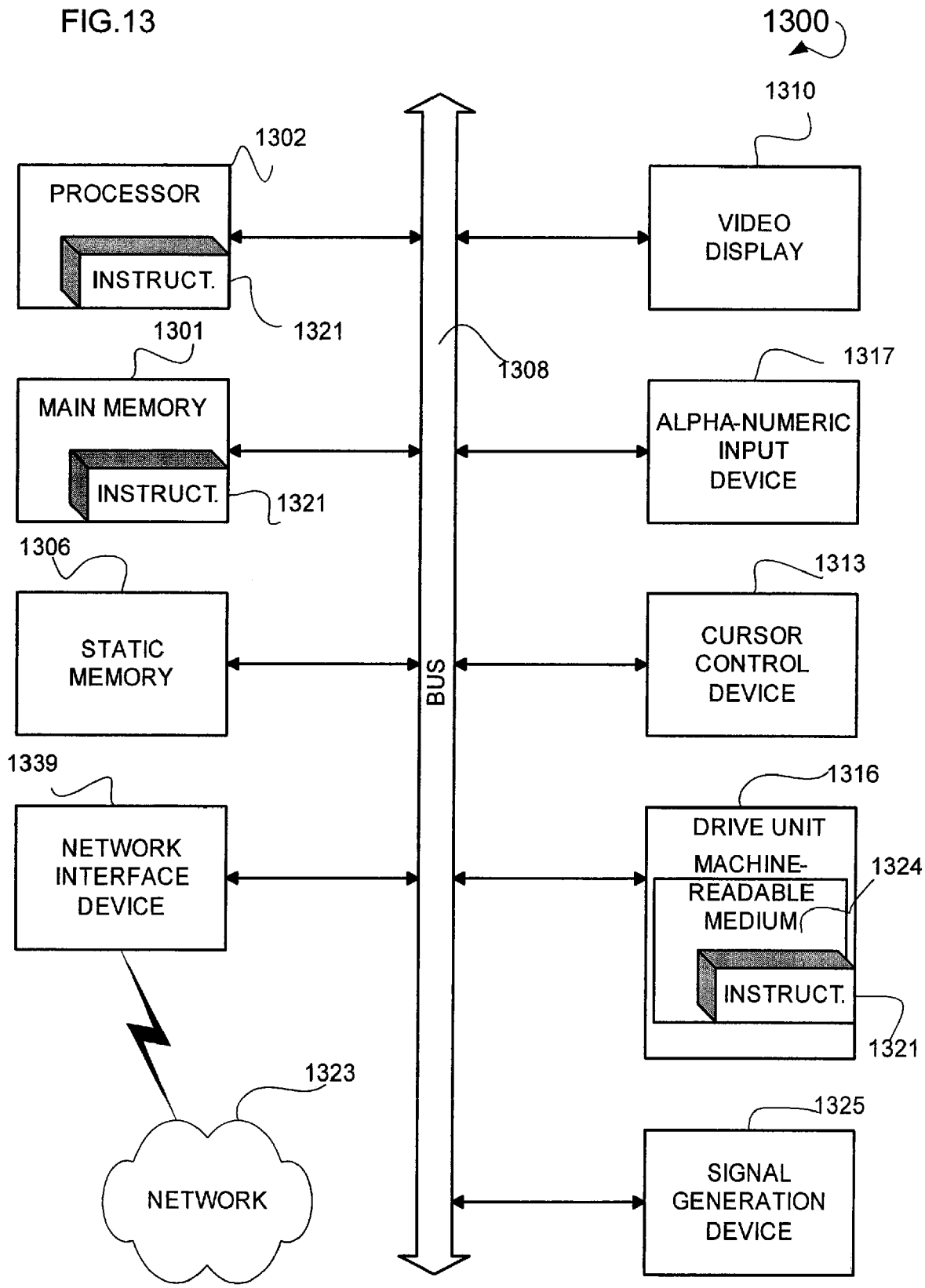
FIG. 13 shows a diagrammatic representation of machine in the example form of a computer system, according to an example embodiment.

FIG. 13 shows a diagrammatic representation of machine in the example form of a computer system 1300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a Central Processing Unit (CPU), a Graphics Processing Unit (GPU) or both), a main memory 1301 and a static memory 1306, which communicate with each other via a bus 1308. The computer system 1300 may further include a video display unit 1310 (e.g., a LCD or a CRT). The computer system 1300 also includes an alphanumeric input device 1317 (e.g., a keyboard), a user interface (UI) cursor controller 1313 (e.g., a mouse), a disk drive unit 1316, a signal generation device 1325 (e.g., a speaker) and a network interface device (e.g., a transmitter) 1339.

The disk drive unit 1316 includes a machine-readable medium 1324 on which is stored one or more sets of instructions and data structures (e.g., software) embodying or utilized by any one or more of the methodologies or functions illustrated herein. The software may also reside, completely or at least partially, within the main memory 1301 and/or within the processor 1302 during execution thereof by the computer system 1300, the main memory 1301 and the processor 1302 also constituting machine-readable media.

The instructions 1321 may further be transmitted or received over a network 1323 via the network interface device 1339 using any one of a number of well-known transfer protocols (e.g., Hyper-Text Transfer Protocol (HTTP), SIP).

While the machine-readable medium 1324 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present invention, or that is capable of storing, encoding, or carrying data structures used by or associated with such a set of instructions. The term "machine-readable medium" shall accordingly be taken to include, but not be limited to, solid-state memories, optical and magnetic media.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving an invite to establish a connection between a caller endpoint device and one of a plurality of callee endpoint devices coupled to a gateway, the invite comprising a media capability of the caller endpoint device;
retrieving a device profile of one of the callee endpoint devices from a device profile database based on the media capability of the caller endpoint device, a network profile of one of the callee endpoint devices from a network profile database, and a device usage profile of one of the callee endpoint devices from a device usage database, the device profile comprising bandwidth and Compression/Decompression (CODECs) requirements and device usage data of one of the callee endpoint devices, the network profile comprising network protocol requirements of one of the callee endpoint devices, the device usage profile comprising data related to the bandwidth usage of the callee endpoint device, and time and date upon which one of the callee endpoint devices can be used;
determining a set of capabilities associated with the plurality of callee endpoint devices coupled to the gateway based on the device profile, the network profile, and the device usage profile of one of the callee endpoint devices;
identifying an initial common media capability between the media capability of the caller endpoint device and the set of capabilities associated with the plurality of callee endpoint devices;
negotiating a connection between the caller endpoint device and a particular callee endpoint device of the plurality of endpoint devices using the initial common media capability;
determining, using one or more processor, if the caller endpoint device and the particular callee endpoint device have a common enhanced media capability; and
re-negotiating the connection between the caller endpoint device and the particular callee endpoint device using the enhanced media capability when the caller endpoint device and the particular callee endpoint device have the common enhanced media capability, the re-negotiating including a request to tear down the negotiated connection between the caller endpoint device and the particular callee endpoint device.

2. The method of claim 1, wherein at least two of the plurality of callee endpoint devices have different media capabilities.

3. The method of claim 1, wherein the identifying the initial common media capability comprises identifying a lowest media capability common to the plurality of callee endpoint devices.

4. The method of claim 1, wherein determining the common enhanced media capability comprises predicting an optimal media capability.

5. The method of claim 4, wherein the optimal media capability is at least one of a higher quality media connection, a lower bandwidth consumption connection, or a secure connection.

6. The method of claim 1, wherein the common media capability comprises a Compression/Decompression (CODECs) algorithm that is initially negotiated during the establishment of the connection.

7. The method of claim 1, wherein the initial common media capability is an audio capability, and the enhanced media capability is a video capability.

8. The method of claim 1, wherein the plurality of callee endpoint devices comprises a single destination identifier.

9. The method of claim 1, wherein the common enhanced media capability comprises at least one of a video media capability, an audio media capability, a data media capability, or a security media capability.

10. The method of claim 1, further comprising setting a Voice over Internet Protocol (VoIP) system allowed bandwidth, the VoIP system allowed bandwidth based upon at least one of a service level agreement, or a user defined preference in the form of a voice system configuration value.

11. The method of claim 1, further comprising initiating a mismatch analysis using an off-hook signal, the off-hook signal identifying the particular callee endpoint device.

12. The method of claim 11, wherein the mismatch is a difference in media Capabilities.

13. The method of claim 11, wherein the mismatch analysis uses a user defined preference to determine the existence of the mismatch.

14. The method of claim 11, wherein the mismatch analysis uses an auto-select feature to implement a service level agreement.

15. A network device comprising:
a receiver to receive an invite to establish a connection between a caller endpoint device and one of a plurality of callee endpoint devices coupled to a gateway, the invite comprising a media capability of the caller endpoint device;
a media capability engine to retrieve a device profile of one of the callee endpoint devices from a device profile database based on the media capability of the caller endpoint device, a network profile of one of the callee endpoint devices from a network profile database, and a device usage profile of one of the callee endpoint devices from a device usage database, the device profile comprising bandwidth and Compression/Decompression (CODECs) requirements and device usage data of one of the callee endpoint devices, the network profile comprising network protocol requirements of one of the callee endpoint devices, the device usage profile comprising data related to the bandwidth usage of the callee endpoint device, and time and date upon which one of the callee endpoint devices can be used;
the media capability engine to determine a set of capabilities associated with the plurality of callee endpoint devices coupled to the gateway, to identify an initial common media capability between the media capability of the caller endpoint device and the set of capabilities associated with the plurality of callee endpoint devices based on the device profile, the network profile, and the device usage profile of one of the callee endpoint devices;
a negotiation engine to negotiate a connection between the caller endpoint device and a particular callee endpoint device of the plurality of endpoint devices using the initial common media capability;
a comparison engine to determine if the caller endpoint device and the particular callee endpoint device have a common enhanced media capability; and
a re-negotiation engine to re-negotiate the connection between the caller endpoint device and the particular callee endpoint device using the enhanced media capability when the caller endpoint device and the particular callee endpoint device have the common enhanced media capability, the re-negotiating including a request to tear down the negotiated connection between the caller endpoint device and the particular callee endpoint device.

16. The network device of claim 15, wherein at least two of the plurality of callee endpoint devices have different media capabilities.

17. The network device of claim 15, wherein to identify the initial common media capability comprises identifying a lowest media capability common to the plurality of callee endpoint devices.

18. The network device of claim 15, wherein to determine the common enhanced media capability comprises predicting an optimal media capability.

19. The network device of claim 18, wherein the optimal media capability is at least one of a higher quality media connection, a lower bandwidth consumption connection, or a secure connection.

20. The network device of claim 15, wherein the common media capability comprises a Compression/Decompression (CODECs) algorithm that is initially negotiated during the establishment of the connection.

21. The network device of claim 15, wherein the initial common media capability is an audio capability, and the enhanced media capability is a video capability.

22. The network device of claim 15, wherein the plurality of callee endpoint devices comprises a single destination identifier.

23. The network device of claim 15, wherein the common enhanced media capability comprises at least one of a video media capability, an audio media capability, a data media capability, or a security media capability.

24. The network device of claim 15, further comprising a system bandwidth engine to set a Voice over Internet Protocol (VoIP) system allowed bandwidth, the VoIP system allowed bandwidth based upon at least one of a service level agreement, or a user selected preference in the form of a voice system configuration value.

25. The network device of claim 15, further comprising a mismatch trigger to initiate a mismatch analysis to analyze a mismatch using an off-hook signal, the off-hook signal identifying the particular callee endpoint device.

26. The network device of claim 25, wherein the mismatch is a difference in media capabilities.

27. The network device of claim 25, wherein the mismatch analysis uses a user defined preference to determine the existence of the mismatch.

28. The network device of claim 25, wherein the mismatch analysis uses an auto-select feature to implement a service level agreement.

29. An apparatus comprising:
means for receiving an invite to establish a connection between a caller endpoint device and one of a plurality of callee endpoint devices coupled to a gateway, the invite comprising a media capability of the caller endpoint device;
means for retrieving a device profile of one of the callee endpoint devices from a device profile database based on the media capability of the caller endpoint device, a network profile of one of the callee endpoint devices from a network profile database, and a device usage profile of one of the callee endpoint devices from a device usage database, the device profile comprising bandwidth and Compression/Decompression (CODECs) requirements and device usage data of one of the callee endpoint devices, the network profile comprising network protocol requirements of one of the callee endpoint devices, the device usage profile comprising data related to the bandwidth usage of the callee endpoint device, and time and date upon which one of the callee endpoint devices can be used;
means for determining a set of capabilities associated with the plurality of callee endpoint devices coupled to the gateway based on the device profile, the network profile, and the device usage profile of one of the callee endpoint devices;
means for identifying an initial common media capability between the media capability of the caller endpoint device and the set of capabilities associated with the plurality of callee endpoint devices;
means for negotiating a connection between the caller endpoint device and a particular callee endpoint device of the plurality of endpoint devices using the initial common media capability;
means for determining if the caller endpoint device and the particular caller endpoint device have a common enhanced media capability; and
means for re-negotiating the connection between the caller endpoint device and the particular callee endpoint device using the enhanced media capability when the caller endpoint device and the particular callee endpoint device have the common enhanced media capability, the re-negotiating including a request to tear down the negotiated connection between the caller endpoint device and the particular callee endpoint device.

30. A non-transitory machine-readable medium comprising instructions, which when implemented by one or more machines that cause the one or more machines to perform the following operations:
receiving an invite to establish a connection between a caller endpoint device and one of a plurality of callee endpoint devices coupled to a gateway, the invite comprising a media capability of the caller endpoint device;
retrieving a device profile of one of the callee endpoint devices from a device profile database based on the media capability of the caller endpoint device, a network profile of one of the callee endpoint devices from a network profile database, and a device usage profile of one of the callee endpoint devices from a device usage database, the device profile comprising bandwidth and Compression/Decompression (CODECs) requirements and device usage data of one of the callee endpoint devices, the network profile comprising network protocol requirements of one of the callee endpoint devices, the device usage profile comprising data related to the bandwidth usage of the callee endpoint device, and time and date upon which one of the callee endpoint devices can be used;
determining a set of capabilities associated with the plurality of callee endpoint devices coupled to the gateway based on the device profile, the network profile, and the device usage profile of one of the callee endpoint devices;
identifying an initial common media capability between the media capability of the caller endpoint device and the set of capabilities associated with the plurality of callee endpoint devices;
negotiating a connection between the caller endpoint device and a particular callee endpoint device of the plurality of endpoint devices using the initial common media capability;
determining if the caller endpoint device and the particular callee endpoint device have a common enhanced media capability; and
re-negotiating the connection between the caller endpoint device and the particular callee endpoint device using the enhanced media capability when the caller endpoint device and the particular callee endpoint device have the common enhanced media capability, the re-negotiating including a request to tear down the negotiated connection between the caller endpoint device and the particular callee endpoint device.

* * * * *

UNITED STATES PATENT AND TRADEMARK OFFICE
CERTIFICATE OF CORRECTION

| | | |
|---|---|---|
| PATENT NO. | : 8,171,146 B2 | |
| APPLICATION NO. | : 11/765543 | |
| DATED | : May 1, 2012 | |
| INVENTOR(S) | : Yaan M. Chen et al. | |

It is certified that error appears in the above-identified patent and that said Letters Patent is hereby corrected as shown below:

On the face page, in field (75), in "Inventors", in column 1, line 2, delete "Faisal Sivayudeen," and insert -- Faisal Siyavudeen, --, therefor.

On the face page, in field (56), under "Other Publications", in column 1, line 11, delete "Working.Group," and insert -- Working Group, --, therefor.

On the face page, in field (74), under "Attorney, Agent, or Firm", in column 2, line 1, delete "Lundbery" and insert -- Lundberg --, therefor.

In column 19, line 40, in Claim 12, delete "Capabilities." and insert -- capabilities. --, therefor.

In column 21, line 43, in Claim 29, delete "caller" and insert -- callee --, therefor.

Signed and Sealed this
Seventh Day of August, 2012

David J. Kappos
*Director of the United States Patent and Trademark Office*